United States Patent [19]

Weeks

[11] 4,425,008

[45] Jan. 10, 1984

[54] WHEEL FOR A TRACKLAYING VEHICLE

[75] Inventor: James B. Weeks, Haslett, Mich.

[73] Assignee: Motor Wheel Corporation, Lansing, Mich.

[21] Appl. No.: 293,663

[22] Filed: Aug. 17, 1981

[51] Int. Cl.³ .................... B62D 55/14; B62D 55/08
[52] U.S. Cl. .................................... 305/24; 305/28; 305/56
[58] Field of Search ............ 305/21, 23, 24, 28, 305/56; 301/5.7, 73; 474/DIG. 901

[56] References Cited

U.S. PATENT DOCUMENTS

| | | | |
|---|---|---|---|
| 386,332 | 7/1888 | McDowell | 301/73 |
| 823,939 | 6/1906 | Everett | 301/5.7 |
| 1,269,179 | 6/1918 | Haynes | 301/63 |
| 1,298,399 | 3/1919 | Putnam | 301/63 |
| 1,341,308 | 5/1920 | Ferris | 301/63 |
| 2,355,942 | 8/1944 | Ash | 305/1 |
| 2,376,802 | 5/1945 | Morse | 305/8 |
| 2,531,111 | 11/1950 | Daniels | 305/10 |
| 2,789,438 | 4/1957 | Hutchinson | 74/242.1 |
| 3,013,843 | 12/1961 | Sinko | 305/10 |
| 3,262,191 | 7/1966 | Albertson et al. | 29/159.01 |
| 4,349,234 | 8/1982 | Hartmann | 305/56 |

FOREIGN PATENT DOCUMENTS 2733307  2/1979  Fed. Rep. of Germany ........ 305/21
674516   6/1952  United Kingdom ................. 305/56

*Primary Examiner*—Joseph J. Rolla
*Assistant Examiner*—Michael S. Huppert
*Attorney, Agent, or Firm*—Barnes, Kisselle, Raisch, Choate, Whittemore & Hulbert

[57] ABSTRACT

An improved wheel assembly for a track assembly of a crawler-type vehicle, and method of making the same, comprising a dual wheel set wherein each wheel of the set has a wheel disc with a central bolt circle portion, an intermediate generally conical portion extending outwardly from the central portion and an axially extending peripheral flange portion. A rim is mounted on said disc flange and preferably a rubber tire carried on the outer surface of the rim. The disc is a standard-type spun tapered truck wheel disc of current standard specification having an outwardly narrowing tapered cross-section. The rim comprises a cylindrical center section and a pair of inwardly extending, preferably slightly divergent peripheral edge flanges, and the rim is preferably secured to the disc peripheral flange by a circumferentially continuous weld at or near the axial center of the rim. The dual wheels of the set are mounted back-to-back relative to one another so as to be adapted to straddle a centrally located row of guide spikes of an associated track.

5 Claims, 2 Drawing Figures

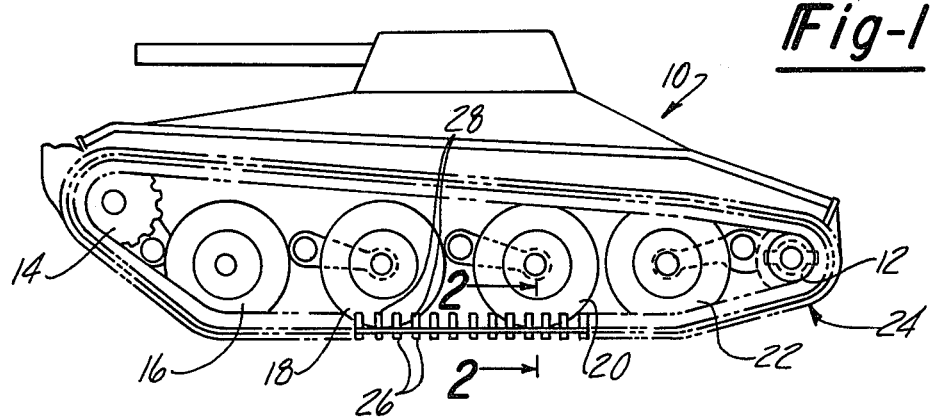
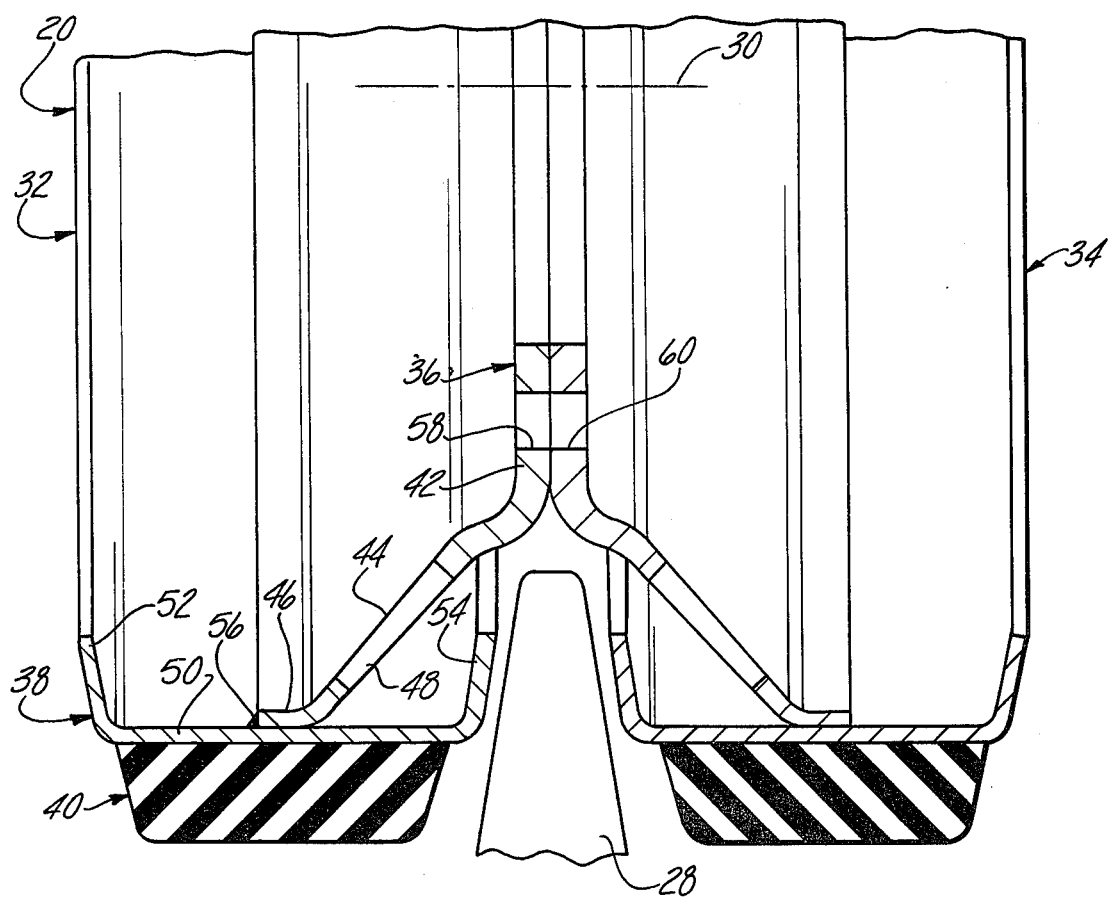

WHEEL FOR A TRACKLAYING VEHICLE

The present invention relates to tracklaying vehicles and, more particularly, to improvements in wheels for tracklaying vehicles and methods of making the same.

In track assemblies of crawler-type vehicles a plurality of wheels are provided in a tandem row on each side of the vehicle to contact and run upon the associated track and carry the vehicle weight through associated suspension systems. One type of known track or bogey wheel assembly comprises a dual wheel set in which two wheels, each having a mounting disc or body and a peripheral rim, are mounted back-to-back onto a hub or spindle, and hard rubber treads are secured to the outer faces of the dual rims to ride upon the track shoes or cleats. The mutually facing edges of the dual rims are spaced apart axially of the wheel to provide clearance for the usual upwardly protruding guide lugs of the track shoes as the wheel rolls along the track. In this art, it is common to find special wheel designs which are characteristically heavy, massive and custom-made and hence unduly expensive and overweight.

Accordingly, it is an object of the present invention to provide an improved road wheel for a tracklaying vehicle which is lighter in weight and considerably less expensive to manufacture without sacrificing load-carrying capacity.

Another object is to provide an improved method of manufacturing the aforementioned wheel.

Other objects, features, and advantages of the invention will become apparent when taken in conjunction with the following detailed description and accompanying scaled drawings wherein:

FIG. 1 is a side elevation of a military-type tracklaying vehicle equipped with an exemplary but preferred embodiment of the invention; and FIG. 2 is a fragmentary cross-sectional view taken on the line 2—2 of FIG. 1, but greatly enlarged thereover.

Although the present invention is particularly designed and adapted for use with the military-type vehicle depicted in FIG. 1 of the drawings, it should be understood that the invention may be used with other types of crawler vehicles, such as those utilized in earth-moving operations.

Referring to FIG. 1, a military-type vehicle 10 is shown having a plurality of drive, road or suspension and idler wheels spaced longitudinally in tandem along each side of the vehicle. The aforementioned wheels include the rearwardly located usual drive or sprocket wheel 12 and a forwardly located idler wheel 14. The tandem wheel array is completed by a suitable number of intermediate road, bogey or suspension wheel assemblies 16, 18, 20 and 22 constructed in accordance with the present invention and identical to one another in the case of the particular vehicle shown in FIG. 1. An endless track 24 of any suitable and desired form is trained around the wheel array and comprises a plurality of circumferentially spaced track shoes 26 having cleats particularly designed for driving engagement with the ground. The track also includes a row of centrally located guide lugs or teeth 28 adapted to interfit the road wheels to prevent the track from wandering off course.

Referring to FIG. 2, one of the road wheel assemblies 20 of the present invention is partially shown in fragmentary section from its central axis 30 downwardly to illustrate in radial cross-section the lower half of such wheel assembly. Wheel assembly 20 comprises a dual wheel set made up of a pair of back-to-back wheels 32 and 34 identical in construction to one another. The inboard wheel 32 comprises a disc 36, a rim 38 secured to the disc and preferably a solid rubber tire 40 affixed to and carried on the outer surface of the rim.

In accordance with one feature of the invention, disc 36 is standard truck-wheel-type disc currently mass produced in large quantities, such as Part No. 80650 manufactured by the assignee herein, Motor Wheel Corporation, of Lansing, Mich., for the last several years so as to have a well-designed and tested construction. Disc 36 consists of a radially extending central bolt circle mounting portion 42, an intermediate generally conical portion 44 having an outwardly narrowing cross-section and an axially extending flange portion 46 at the peripheral outer edge of the disc. The intermediate portion 44 is provided with the usual series of circumferentially spaced hand holes 48. Preferably, wheel disc 36 is manufactured from a circular flat disc blank and is made by spin-tapering equipment following the well-known sine law spinning technique, such as that disclosed in U.S. Pat. No. 3,262,191. Enhanced fatigue life may be imparted by further processing in accordance with the U.S. Golata and Kinstler U.S. Pat. No. 4,241,597, which is also being commercially practiced to provide commercially available truck wheel discs made to standard specifications.

Wheel rim 38 is a non-standardized part and is formed from flat strip stock coiled into a hoop, butt welded and then roll or die formed to provide a cylindrical rim base portion 50 having a pair of integral flanges 52 and 54 extending radially inwardly from the opposite rim base edges, preferably at an angle to 4° to 6° relative to the radius of the rim base so as to diverge slightly from one another. Flange 54 of rim 38 is preferably surfaced hardened on its exterior surface so as to better resist the wearing action imparted by the track guide teeth 28.

In accordance with a feature of the method of the invention, rim 38 is roll or die formed in at least two stages, with flange 54 fashioned to its final contour in the first stage and the outboard flange 52 in the second stage. Thus rim 38 after first stage forming has an axially extending cylindrical portion at its peripheral edge axially opposite flange 54 to permit press fit assembly of disc 36 into the rim. Disc 36 is preferably secured to the rim by a circumferentially continuous weld 56, and then the outboard flange 52 roll or die formed to its final contour shown in FIG. 2.

Outboard wheel 34 of wheel assembly 20 is constructed identical to inboard wheel 32 as described above, and mounted back-to-back therewith by suitable mounting lugs to an associated wheel mounting spindle (not shown in FIG. 2), the lugs (also not shown) being inserted through the aligned bolt holes 58 and 60 of wheels 32 and 34 respectively.

From the foregoing description it will now be appreciated that the improved road wheel for a tracklaying vehicle of the present invention provides several advantages over prior commercial road wheels. The use of the commercially available, mass produced spun-tapered disc 36 greatly reduces the cost of the wheel yet provides the lightest weight disc section produceable for a given load carrying capacity. The mounting of rim 38 on the disc near the mid-point of the rim, in conjunction with the provision of the dual tapered flanges 52 and 54 of rim 38, shortens the unsupported span and provides a high-strength cross-section modulus, thereby making it possible to use thinner material in the rim so as to reduce wheel weight without reducing load capacity. Commercial wheel manufacturing equipment can be employed to manufacture the wheel from low alloy Class B steel sheet stock, further reducing manufacturing costs. Moreover, the existing contour of the already commercially available disc 36 has been found to be already adapted, when the mating disc of the dual wheel set are mounted back-to-back, to provide the necessary center groove with sufficient clearance for standard size track guide teeth 28.

I claim:

1. An improved road wheel assembly for running on a track assembly of a crawler-type vehicle wherein the track assembly has a centrally located row of tapered guide spikes, said wheel assembly comprising a dual wheel set wherein each wheel of the set has a wheel disc with a centrally located bolt circle portion, an intermediate generally conical portion extending outwardly from said central portion and an axially extending peripheral flange portion terminating at a free edge thereof, a rim formed from flat strip stock externally mounted by press fit on said disc flange and permanently secured thereto by only one circumferential weld joint along said free edge, and an elastomeric tire carried on the outer surface of said rim, said disc having an outwardly narrowing tapered cross-section, said wheels of the set being mounted back-to-back relative to one another so as to be adapted to straddle the centrally located row of guide spikes of the associated track assembly, each said rim extending axially beyond the associated said disc flange and having a pair of integral flanges one at each of the opposite sides of said rim, each rim flange being spaced axially from said associated disc flange and extending radially inwardly and terminating in a free edge disposed clear of said associated disc, said rim flanges having sufficient radial length to reinforce the associated rim and accept the wear of the guide spikes as said rim rotates and passes along said track, each said disc bolt circle portion being thicker than said disc intermediate portion so as to withstand impinging lateral loads from the guide spikes and each said disc flange portion being thinner than the associated intermediate portion of said disc, said rim and disc reinforcing each other at their juncture to thereby afford the greatest economy of material.

2. The wheel as set forth in claim 1 wherein each said wheel disc comprises a spun tapered metal disc made by spinning a circular metal blank over a conical mandrel, the conical angle being chosen by specifying the thickness of material needed at said central bolt circle portion to withstand the repeated lateral loading of the guide spikes and the material thickness necessary at said outer peripheral flange to withstand repeated radial loading, the conical angle of said conical portion being determined by sine low spinning whereby the cold working of the metal during the spinning process imparts greater strength and fatigue resistance so as to afford a reduction of material thickness to thereby obtain greater economy of weight and cost.

3. The wheel as set forth in claim 2 wherein said disc flange portion has a short axial dimension relative to that of said rim and is located at or near the axial center of said rim so as to reinforce the rim to thereby provide the shortest span between the support afforded by both of said rim flange portions and said disc flange, thereby enabling a reduction in the thickness of material used in said rim and thus economizing weight and cost.

4. The wheel as set forth in claim 3 wherein each said rim comprises a cylindrical center portion extending axially between the associated said rim edge flanges, each said pair of rim flanges being of cone shaped obliquity relative to said rim cylindrical portion so as to inwardly diverge from one another, said rim flanges closest to the guide spikes matching the taper angle of the sides of the guide spikes and being hardened to resist the wearing action of the guide spikes.

5. A method of making an improved wheel for a track assembly of a crawler-type vehicle of the type specified in claim 3, said method comprising the steps of:
   (a) providing said disc in finished form,
   (b) forming said rim from flat strip stock coiled into a hoop, butt welded and then roll or die formed with one of said rim flanges having its final contour and the other of said rim flanges remaining initially cylindrical in contour as an integral extension of the center portion of said rim,
   (c) inserting said disc with a press fit axially into said rim to a final central location with the peripheral free edge of said disc spaced axially from said one rim flange and with the bolt circle portion of the disc protruding axially beyond said one rim flange,
   (d) welding said disc flange to said central portion of said rim along the juncture of the disc free edge with said rim,
   (e) then forming said other rim flange to its final contour axially spaced from and clear of said disc, and,
   (f) then assembling two of such wheels back-to-back to form a dual wheel set wheel assembly of the type specified.

* * * * *